United States Patent

Eaton

[15] 3,693,031

[45] Sept. 19, 1972

[54] TIMING CIRCUIT FOR PROVIDING LINEAR TIMING PERIODS

[72] Inventor: Favre E. Eaton, Winsted, Conn.

[73] Assignee: General Time Corporation, Phoenix, Ariz.

[22] Filed: April 21, 1971

[21] Appl. No.: 135,837

[52] U.S. Cl. ....................307/293, 307/246, 307/304

[51] Int. Cl. ............................................H03k 17/26

[58] Field of Search.......307/228, 246, 251, 293, 304

[56] References Cited

UNITED STATES PATENTS

| | | | |
|---|---|---|---|
| 3,286,200 | 11/1966 | Foulger | 307/234 X |
| 3,395,293 | 7/1968 | Perloff | 307/228 |
| 3,447,099 | 5/1969 | Lockshaw | 307/228 X |
| 3,496,389 | 2/1970 | Zegarski et al. | 307/293 |
| 3,582,678 | 6/1971 | Davis, Jr. et al. | 307/293 X |
| 3,413,491 | 11/1968 | Reeves et al | 307/235 |
| 3,473,054 | 10/1969 | Wieczorek | 307/293 |

*Primary Examiner*—Stanley D. Miller, Jr.
*Attorney*—Pennie, Edmonds, Morton, Taylor & Adams

[57] ABSTRACT

An electronic timing circuit for generating linear timing periods by providing a constant current discharge path from a storage capacitor. A storage capacitor is charged through a gating transistor to a preset level. The gating transistor is then turned off, and the capacitor discharges through the serial arrangement of a field-effect transistor and a resistor. The field-effect transistor is self-biased such that the current flow from the capacitor through the transistor to the resistor is constant with respect to time. This is accomplished by varying the impedance of the transistor proportionately to the charge on the storage capacitor. The potential at the junction of the field-effect transistor and the resistor is detected by a high input impedance device which drives an output circuit.

A delay on deenergization mode of operation is provided wherein a steady state current is continuously passed through the serial arrangement of the field-effect transistor and the resistor. When the output circuit is to be deenergized, the steady state current is turned off allowing the storage capacitor to discharge for a linear period of time at the end of which the output is deenergized. The duration of the discharge or timing interval may be adjusted by varying the bias at the gate of the FET.

8 Claims, 1 Drawing Figure

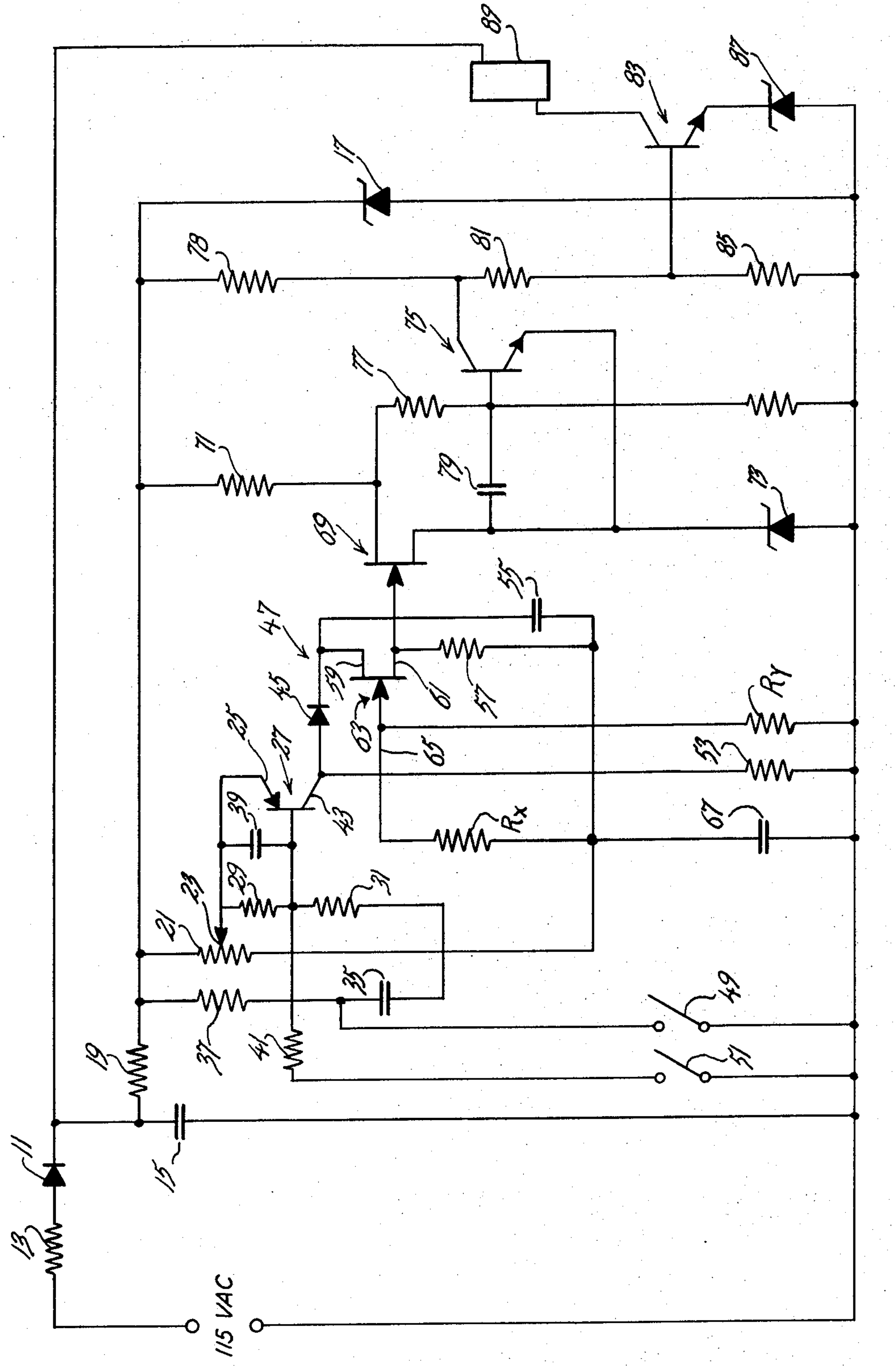
115 VAC
Rx
RY

TIMING CIRCUIT FOR PROVIDING LINEAR TIMING PERIODS

BACKGROUND OF THE INVENTION

This invention relates to an electronic timer for generating linear timing periods having a constant current discharge path from a timing capacitor.

In the past, timing circuits have typically been comprised of a storage capacitor which was charged to a preset level and then discharged through a resistor. These circuits did not provide accurate timing because the rate of current discharge from the capacitor was exponential rather than linear with time. Thus, these past timing circuits discharged rapidly at first but then discharged at progressively decreasing rates.

Prior circuits have been designed to obviate this problem of non-linearity. For example, some prior art timing circuits have utilized a bootstrap arrangement for increasing linear response while others have relied on the Miller sweep to gain linearity. Each of these types of circuits are complex and must satisfy stringent and competing component requirements before they will generate a stable and linear time period. Other circuits have been designed that will generate a linear time period with the aid of a compensating network. However, each of these aforementioned circuits for generating a linear time period are expensive to manufacture on a mass scale because of the extra components required and the design requirements that each of these components must satisfy.

It, therefore, is an object of this invention to provide a simplified timing circuit for generating substantially linear timing periods.

It is another object of this invention to provide an economical timing circuit having a constant current discharge path for a storage capacitor.

SHORT STATEMENT OF THE INVENTION

Accordingly, this invention relates to a simplified timing circuit having a constant current discharge path from a storage capacitor for generating linear timing periods. A storage capacitor is charged through a gate to a preset level. The capacitor then discharges through a resistor and a variable resistive device such as a field-effect transistor. The field-effect transistor is self-biased so that its resistance to the discharge current varies proportionally to the voltage across the storage capacitor. The discharge current is sensed by an output circuit having a high input impedance so that the output circuit has no effect on the time constant of the timing circuit.

BRIEF DESCRIPTION OF THE DRAWINGS

Other objects, advantages, and features of this invention will become more fully apparent from the following detailed description, appended claims, and the accompanying drawing which is a schematic diagram of the preferred embodiment of the timing circuit of this invention.

DETAILED DESCRIPTION OF THE PREFERRED EMBODIMENT

Referring to the figure, a standard 115 volt AC source is shown connected to a diode 11 via an input resistor 13. The diode half wave rectifies the AC input to provide a DC source of power for the timing circuit of this invention. The rectified input voltage is filtered by a capacitor 15 to smooth the rectified input. The rectified and filtered voltage is regulated by a zener diode 17 which is connected across the filtering capacitor 15 via a voltage dropping resistor 19. The zener breakdown voltage of diode 17 is chosen such that the ripples in the filtered supply voltage are eliminated. In the preferred embodiment this zener breakdown voltage, is 16 volts, however, it should be understood at any suitable voltage level could be chosen that would be compatable with the circuitry of this invention.

The input to the timing circuit includes a potentiometer 21 having one side thereof connected to the power supply voltage and the other side connected to the timing circuit which will hereinafter be designated by the numeral 47. The center tap of potentiometer 21 is connected to the emitter terminal 25 of PNP transistor 27 which transistor serves as a gate to the timing circuit 47. The biasing network for the transistor 27 includes a pair of resistors 29 and 31. Resistor 29 is connected between the base 33 of the transistor and the center tap 23 of the potentiometer. Resistor 31 is connected between the base of transistor 27 and one terminal of a capacitor 35. The other terminal of capacitor 35 is connected through resistor 37 to the output of the power supply. A transient surpressing capacitor 39 is connected across the base and emitter terminals of the transistor 27 to prevent high voltage transients from accidentally turning on the transistor. A first switch 39, designated an interval timing switch, is connected to the junction of resistor 37 and capacitor 35 at one end and to a reference potential such as ground at the other end. A second switch 51, designated a delay on deenergization switch, is connected via resistor 41 to the base of transistor 27. Switches 49 and 51 may be of any suitable type, such as, for example, an electronic or manual switch. The collector terminal 43 of gating transistor 27 is connected through a blocking diode 45 to the constant current timing circuit 47. The collector terminal is also connected via a load resistor 53 to reference potential or ground.

The constant current timing circuit 47 is comprised of a timing capacitor 55 which is connected across the serial arrangement of a resistor 57 and the source and drain terminals 59 and 61, respectively, of a field-effect transistor 63, hereinafter designated FET. The gate terminal 65 of the FET is biased by means of a self-biasing circuit which includes a resistor $R_y$ connected between the gate terminal and ground, and a resistor $R_x$ also connected between the gate and ground via a capacitor 67. The capacitor 67 surpresses transients in the biasing circuit thereby preventing FET 63 from being turned on by undesirable noise voltages. $R_x$ and $R_y$ are adjustable to establish varying rates of discharge for the storage capacitor 55 and hence varying time periods.

The voltage at the junction of the drain terminal of FET 63 and resistor 57 is sensed by FET 69. As is well-known in transistor technology, FETs present an almost infinite input impedance. Accordingly, there is no current drain from the timing circuit 47 to the FET 69. Thus, the timing period of circuit 47 is not affected by the FET 69 which is part of the output circuitry. The source terminal of FET 69 is connected to the supply voltage via load transistor 71. The drain terminal of the FET is connected to reference potential or ground through a zener diode 73. The zener diode establishes a suitable bias level at the drain of the FET which in the preferred embodiment is 3.9 volts. It should be understood that any suitable means for establishing a proper bias at the drain of FET 69 may be utilized in lieu of the diode 73. The source of FET 69 is connected to the base of an NPN transistor 75 via a resistor 77. The base of transistor 75 is connected to the drain of FET 69 via a transient suppressing capacitor 79. Capacitor 79 prevents transistor 75 from turning on when a voltage transient appears at the gate of the transistor 75. The emitter terminal of transistor 75 is connected to ground via zener diode 73. The collector terminal of the transistor is connected to the power supply via resistor 78 and in addition is connected via resistor 81 to the base of a second NPN transistor 83 which transistor gates an output utilization device 89 which in this embodiment is a relay. The base of transistor 83 is biased by means of a resistor 85 which is connected in series with resistors 81 and 78 across the power supply. The collector of transistor 83 is connected to one end of the output utilization device 89 which device may be connected at its other end to the diode 11. A bias is established at the emitter terminal of the transistor 83 by means of a zener diode 87 which bias level is 3.9 volts in the preferred embodiment.

As an example of a first mode of operation, interval switch 49 is closed thereby connecting the junction of capacitor 35 and resistor 37 to ground. Current will then flow from the power supply through resistors 29 and 31 to the capacitor 35 thereby biasing transistor 27 on. With transistor 27 turned on, storage capacitor 55 is charged through diode 45. The charging time for capacitor 55 is very short compared to discharge time and accordingly the timed interval is considered to begin when the interval switch is closed. When capacitor 55 is charged to approximately the potential at the center tap of potentiometer 21, the transistor 27 is turned off thus terminating the charging of capacitor 55. It is understood that the charge level on capacitor 55 can be varied by varying the value of capacitor 35 thereby changing the time period during which capacitor 55 is charged. Thus, different timing periods can be generated by this circuit without specifically changing the timing circuit 47 per se.

After transistor 27 turns off, the storage capacitor discharged through FET 63 and resistor 57. Because of the aforementioned self-biasing circuit, the resistance across the source and drain terminals of the FET varies proportionally to the charge on capacitor 55. Thus, as the capacitor discharges, i.e., the voltage thereacross decreases, the resistance of the FET decreases thereby maintaining a constant current flow through resistor 57.

The voltage at the junction of resistor 57 and FET 63 is sensed by the gate terminal of FET 69. When capacitor 55 is discharging at a linear rate through FET 63 and resistor 57, the voltage level at the gate of FET 69 is sufficient to keep FET 69 turned on. With FET 69 on, transistor 75 is turned off. Accordingly, transistor 83 is turned on permitting a half wave rectified current to pass from diode 11 through the relay 89, transistor 83, and diode 87 to ground. When capacitor 55 is discharging, the potential at the gate of FET 69 is not sufficient to turn the FET on. Accordingly, the bias at the base of transistor 75 is raised to a point where the transistor is turned on. With transistor 75 turned on, the voltage at the base of transistor 83 is substantially that at the cathode of zener diode 73, i.e., 3.9 volts. Thus, transistor 83 is turned off and no current will pass through the output device.

As an example of a second mode of operation, the delay on deenergization switch 51 is closed thereby turning transistor 27 on. Current from the voltage supply passes through the center tap of potentiometer 21, the transistor 27, and diode 45 to the storage capacitor 55 until it becomes fully charged. At this point, the transistor 27 is still conducting since its base is connected to ground via switch 51 and resistor 41. Thus, current will pass through FET 63 just as if the capacitor 55 was discharging. Accordingly, FET 69 is turned on, transistor 75 is turned off, and transistor 83 is turned on thereby energizing relay 89.

When switch 51 is opened, transistor 27 is turned off, and therefore the storage capacitor 55 starts to discharge. FET 69 remains turned on until capacitor 55 becomes fully discharged, i.e., at the end of the timing period. When capacitor 55 is discharged to a low level and the voltage at 61 starts to drop, FET 69 is turned off, transistor 75 is turned on, and transistor 83 is turned off thereby deenergizing the relay.

It should be understood that the timing period may be varied by changing the value of capacitor 55, or resistor 57, or the resistance of FET 65. The resistance of FET 63 is varied by adjusting the values of biasing resistors $R_Y$ and $R_x$.

It further should be understood that while two modes of operation and a circuit therefor have been disclosed, other modes of operation can be achieved using the timing circuit of this invention as defined by the appended claims.

I claim:

1. A timing circuit for providing linear timing periods comprising a storage capacitor for storing a predetermined charge and for thereafter discharging for a period of time, input means for charging said capacitor, semiconductor means for maintaining the rate of discharge of said capacitor constant with time, the resistance of said semiconductor being proportional to the charge on said capacitor, self-biasing means for varying the resistance of said semiconductor means proportional to the charge on said storage capacitor, and output means for providing a first output condition when said capacitor is discharged.

2. The timer of claim 1 wherein said semiconductor is a field-effect transistor having a gate, a source and a drain, said source being connected to said storage capacitor, said drain being connected to a discharge resistor, and said gate being connected to said biasing means.

3. The timer of claim 2 wherein said input means comprises gating means for controlling the flow of charge to said capacitor, and unilateral circuit means for preventing said capacitor from discharging through said input means.

4. The timer of claim 3 wherein said output means comprises high impedance means for sensing the condition of said storage capacitor, and gating means for conducting current when said storage capacitor is discharging and for inhibiting current conduction when said capacitor is not discharging.

5. The timer of claim 4 wherein said sensing means is a field-effect transistor, the gate of said field-effect transistor sensing said current flow through said variable resistance field-effect transistor.

6. The timer of claim 5 further comprising switch means for maintaining said capacitor in a charged condition and for maintaining said output means in said first output condition.

7. The timer of claim 6 wherein said switch means is connected to said gating means to enable said gating means to maintain said capacitor charged when said switch is in a first state, and for disabling said gate when said switch is in a second state, said capacitor being discharged when in said second state.

8. A method of providing linearly timed periods comprising the steps of charging a storage capacitor to a preset level, discharging said capacitor, maintaining the rate of discharge constant with time by varying the resistance of a semiconductor proportional to the charge on said storage capacitor and, sensing when said capacitor is discharging.

* * * * *